US008029580B2

(12) United States Patent
Kim et al.

(10) Patent No.: US 8,029,580 B2
(45) Date of Patent: Oct. 4, 2011

(54) FUEL CELL REFORMER AND SYSTEM

(75) Inventors: Ju-Yong Kim, Suwon-si (KR); Ho-Jin Kweon, Suwon-si (KR); Yeong-Chan Eun, Suwon-si (KR); Sung-Yong Cho, Suwon-si (KR); Seong-Jin An, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1093 days.

(21) Appl. No.: 11/154,058

(22) Filed: Jun. 15, 2005

(65) Prior Publication Data

US 2005/0287401 A1 Dec. 29, 2005

(30) Foreign Application Priority Data

Jun. 29, 2004 (KR) .................. 10-2004-0049288

(51) Int. Cl.
*B01J 8/02* (2006.01)
*B01J 8/04* (2006.01)
*B01J 7/00* (2006.01)
*F28F 27/02* (2006.01)
*C10J 3/68* (2006.01)

(52) U.S. Cl. .............. 48/61; 429/423; 165/66; 165/103; 165/172

(58) Field of Classification Search .............. 429/17, 429/20, 423; 165/66, 103, 140–156; 48/61
See application file for complete search history.

(56) References Cited

U.S. PATENT DOCUMENTS

| 4,932,981 | A  | * | 6/1990 | Ohsaki et al. ............... 48/94 |
| 6,348,278 | B1 | * | 2/2002 | LaPierre et al. ............. 429/17 |
| 7,066,973 | B1 | * | 6/2006 | Bentley et al. .............. 48/197 R |
| 2002/0088740 | A1 | | 7/2002 | Krause et al. |
| 2002/0172630 | A1 | | 11/2002 | Ahmed et al. |
| 2003/0054213 | A1 | * | 3/2003 | Ishikawa .................... 429/19 |
| 2003/0161768 | A1 | * | 8/2003 | Kawamoto et al. ........... 422/188 |
| 2004/0038095 | A1 | * | 2/2004 | Kushibiki et al. ............. 429/20 |

(Continued)

FOREIGN PATENT DOCUMENTS

CN 1341076 A 3/2002

(Continued)

OTHER PUBLICATIONS

European Search Report, dated Oct. 18, 2005, for Application No. 05105819.6, in the name of Samsung SDI Co., Ltd.

(Continued)

*Primary Examiner* — Robert Hodge
*Assistant Examiner* — Stephen Yanchuk
(74) *Attorney, Agent, or Firm* — Christie, Parker & Hale, LLP

(57) ABSTRACT

A reformer for a fuel cell system has at least a dual pipe configuration that forms independent spaces through which fuel containing hydrogen passes. The reformer includes a first reaction assembly for generating heat energy by an oxidation reaction of the fuel and a second reaction assembly for generating hydrogen gas from the fuel through a reforming reaction using the heat energy. The reformer further includes a first pipe, and a second pipe having a circumference significantly less than a circumference of the first pipe to thereby allow for positioning of the second pipe within the first pipe. An oxidation catalyst layer is formed in the second pipe, and a reforming catalyst layer is formed between the first pipe and the second pipe.

45 Claims, 7 Drawing Sheets

U.S. PATENT DOCUMENTS

| | | |
|---|---|---|
| 2004/0068933 A1 | 4/2004 | Nakamura et al. |
| 2004/0126288 A1* | 7/2004 | Fuju et al. .................. 422/202 |
| 2004/0133202 A1* | 7/2004 | Suzuki et al. ................ 606/61 |
| 2005/0189094 A1* | 9/2005 | Van Decker et al. ......... 165/140 |
| 2005/0241232 A1* | 11/2005 | Reinke et al. ................. 48/76 |

FOREIGN PATENT DOCUMENTS

| | | |
|---|---|---|
| EP | 0 199 878 | 11/1986 |
| EP | 1 024 111 A1 | 8/2000 |
| EP | 1 167 282 A1 | 1/2002 |
| JP | 61-247601 A | 11/1986 |
| JP | 11-021103 | 1/1999 |
| JP | 11-510311 T | 9/1999 |
| JP | 2001-135336 | 5/2001 |
| JP | 2002-293502 | 10/2002 |
| JP | 2003-089505 | 3/2003 |
| JP | 2003-212507 | 7/2003 |
| JP | 2003-277019 | 10/2003 |
| JP | 2004-026596 | 1/2004 |
| JP | 2004-139846 | 5/2004 |
| JP | 2004-515444 T | 5/2004 |
| JP | 2004-535350 T | 11/2004 |
| JP | 2004-536006 T | 12/2004 |
| JP | 2005-500966 T | 1/2005 |
| WO | WO 97/21256 | 6/1997 |
| WO | WO 02/34383 A1 | 5/2002 |
| WO | WO 02/48630 A1 | 6/2002 |
| WO | WO 02/087745 A1 | 11/2002 |
| WO | WO 02/088022 A1 | 11/2002 |
| WO | WO 02/096797 A2 | 12/2002 |

OTHER PUBLICATIONS

U.S. Office action dated Jul. 15, 2009, for related U.S. Appl. No. 11/140,357, noting U.S. Publications listed in this IDS.

U.S. Office action dated Jul. 1, 2010, for related U.S. Appl. No. 11/140,357.

U.S. Office action dated Nov. 9, 2010, for cross reference U.S. Appl. No. 11/140,357.

* cited by examiner

FUEL CELL REFORMER AND SYSTEM

CROSS-REFERENCE TO RELATED APPLICATIONS

This application claims priority to and the benefit of Korean Patent Application No. 10-2004-0049288 filed on Jun. 29, 2004 in the Korean Intellectual Property Office, the entire content of which is incorporated herein by reference.

BACKGROUND OF THE INVENTION (a) Field of the Invention

The present invention relates to a fuel cell system, and more particularly, to a fuel cell system employing a reformer with an improved structure.

(b) Description of the Related Art

A fuel cell is a system for producing electric power. In a fuel cell, chemical reaction energy between oxygen and hydrogen contained in hydrocarbon-group materials such as methanol, ethanol, and natural gas is directly converted into electric energy.

Depending on the type of electrolyte used, the fuel cell is classified into different types, including: phosphate fuel cell, molten carbonate fuel cell, solid oxide fuel cell, and polymer electrolyte or alkali fuel cell. Although each of these different types of fuel cells operates using the same principles, they differ in the type of fuel, catalyst, and electrolyte used, as well as in drive temperature.

A polymer electrolyte membrane fuel cell (PEMFC) has been developed recently. As compared to other fuel cells, the PEMFC has excellent output characteristics, a low operating temperature, and fast starting and response characteristics. The PEMFC has a wide range of applications. It may be used in vehicles, in the home and in buildings, and for the power source in electronic devices.

The basic components of the PEMFC are a stack, reformer, fuel tank, and fuel pump. The stack forms the main body of the fuel cell. The fuel pump supplies fuel in the fuel tank to the reformer. The reformer reforms the fuel to generate hydrogen gas, and supplies the hydrogen gas to the stack. Accordingly, the PEMFC sends the fuel in the fuel tank to the reformer by operation of the fuel pump, the fuel is reformed in the reformer to generate hydrogen gas, and the hydrogen gas undergoes an electrochemical reaction with oxygen in the stack to thereby generate electric energy.

In the above fuel cell system, the stack (where the generation of electricity takes place) is structured to include a few to a few tens of unit cells realized with a membrane electrode assembly (MEA), with separators provided on both sides thereof. In the MEA, an anode electrode and a cathode electrode are provided opposing one another with an electrolyte layer interposed therebetween. Further, the separator is typically realized using what is referred to in the art as a bipolar plate, and acts to separate each of the MEAs. The separator also functions to provide a pathway through which hydrogen gas and oxygen, which are required for fuel cell reaction, are supplied to the anode electrode and cathode electrode of the MEA. In addition, the separator functions as a conductor for connecting the anode electrode and cathode electrode of each MEA in series. Accordingly, hydrogen gas is supplied to the anode electrode and oxygen is supplied to the cathode electrode via the separator. Through this process, an oxidation reaction of the hydrogen gas occurs in the anode electrode, and a reduction reaction of the oxygen occurs in the cathode electrode. Electricity is generated by the movement of electrons occurring during this process. Heat and moisture are also generated.

The reformer in the fuel cell system described above is a device that generates hydrogen gas from fuel containing the hydrogen through a chemical catalytic reaction realized by heat energy. The reformer typically includes a reforming reactor that generates the heat energy and hydrogen gas from fuel, and a reducer for reducing the concentration of carbon monoxide contained in the hydrogen gas. The reforming reactor utilizes heat generation and heat absorption characteristics employing catalytic processes. In particular, the reforming reactor includes a heat generator for creating reaction heat through a catalytic oxidation reaction, and a heat absorber that receives the reaction heat and generates hydrogen gas through a catalytic reforming reaction.

However, since in the conventional reformer the heat generator and heat absorber are provided as independent units, efficiency of heat transfer is reduced as a result of heat exchange not occurring directly between the heat generator and heat absorber. This separate formation of the heat generator and heat absorber also increases the overall size of the system. Finally, fuel supplied to the reformer is pre-heated during the initial operation of the conventional fuel cell system, and the energy required for this process acts to reduce the overall efficiency of the system.

SUMMARY OF THE INVENTION

In one exemplary embodiment of the present invention, there is provided a reformer for a fuel cell system and a fuel cell system including the reformer, in which a structure is used for the reformer that is simple and able to realize improved reaction and heat efficiencies during the generation of hydrogen gas.

In an exemplary embodiment of the present invention, the reformer has a pair of pipes arranged as a pipe assembly that forms independent spaces through which fuel containing hydrogen passes. The pipe assembly includes a first reaction assembly for generating heat energy by an oxidation reaction of the fuel and a second reaction assembly surrounding the first reaction assembly for generating hydrogen gas from the fuel through a reforming reaction using the heat energy.

The pipe assembly includes a first pipe and a second pipe having an outer circumference less than an inner circumference of the first, the independent spaces being formed respectively in the second pipe and between the first pipe and the second pipe. The first reaction assembly may include an oxidation catalyst layer formed within an interior space of the second pipe, the oxidation catalyst layer for facilitating an oxidation reaction.

The second reaction assembly may include a reforming catalyst layer formed in the space between the first pipe and the second pipe, the reforming catalyst layer for facilitating a reforming reaction.

Further, the second reaction assembly may include a reforming catalyst layer formed in the space between the first pipe and the second pipe that generates hydrogen gas from the fuel by a catalytic reforming reaction and a water-gas shift catalyst layer that reduces the concentration of carbon monoxide contained in the hydrogen gas.

In another aspect, a reformer for a fuel cell system has at least a pipe configuration forming independent spaces through which fuel containing hydrogen passes, and includes a first reaction assembly for generating a predetermined heat energy by an oxidation reaction of the fuel, a second reaction assembly surrounding the first reaction assembly for generating hydrogen gas from the fuel through a reforming reaction using the heat energy, and a heat transfer unit for transferring the heat energy to fuel supplied to the second reaction assembly.

The pipe assembly may further include a first pipe and a second pipe having a circumference significantly less than a circumference of the first pipe to thereby allow for positioning of the second pipe within the first pipe, long axes of the first and second pipes substantially overlapping, the independent spaces being formed respectively in the first pipe and between the first pipe and the second pipe.

The heat transfer unit may include a first pass member wrapped around an outer circumference of the first pipe in a coil configuration, and communicating with the space in the second pipe and at least one second pass member wrapped around the outer circumference of the first pipe in a state contacting the first pass member and communicating with the space between the first pipe and the second pipe.

In yet another aspect, a first reaction assembly may include an oxidation catalyst layer for generating a predetermined heat energy by an oxidation reaction of fuel containing hydrogen and a second reaction assembly may include a reforming catalyst layer for generating hydrogen gas from the fuel through a reforming reaction using the heat energy, the reforming catalyst layer being formed in the space between the first pipe and the second pipe and a heat transfer unit for transferring the heat energy to fuel supplied to the second reaction assembly.

The first reaction assembly may be formed by connecting a first cap having an injection hole on one end of the second pipe, and connecting a second cap having an exhaust hole on the other end of the second pipe. The second reaction assembly may be formed by connecting a third cap having an injection hole on one end of the first pipe and connecting a fourth cap having an exhaust hole on the other end of the first pipe.

The third cap may include a connecting hole through which the second pipe passes and the injection holes are formed in the third cap radially from the connecting hole to thereby surround the connecting hole.

The heat transfer unit may include a first pass member wrapped around an outer circumference of the first pipe in a coil configuration, and connected to the exhaust hole of the second cap. At least one second pass member may be wrapped around the outer circumference of the first pipe in a state contacting the first pass member, and connected to the injection hole of the third cap.

The second reaction assembly may include a water-gas shift catalyst layer formed adjacent to the reforming catalyst layer in the vicinity of the exhaust hole of the fourth cap.

Each of the first pipe and the second pipe may be formed substantially as a cylindrical pipe, and made of a conductive material selected from the group consisting of stainless steel, aluminum, copper, and iron. However, those skilled in the art will appreciate that the pipe may be of any shape, such as for example oval, rectangular, hexagonal, octagonal.

The reformer may further include an insulator that fully encompasses the first and second reaction assemblies. The insulator may include an inner wall and an outer wall that surrounds the inner wall while a maintaining a predetermined gap with the inner wall, wherein a vacuum is formed the gap between the inner wall and the outer wall. The inner wall and the outer wall may be made of a material selected from the group consisting of ceramic, stainless steel, aluminum, and a mixture thereof.

The insulator may include a tube substantially in the form of a cylinder with a first end open and a second end closed and a sealing cap connected to the first end of the tube to thereby seal the tube.

In still yet another aspect, the heat transfer unit may include a first pass member wrapped around an outer circumference of the first pipe in a coil configuration and communicating with the space in the second pipe and at least one second pass member wrapped around the outer circumference of the first pipe in a coil configuration in an alternating manner with the first pass member while contacting the same, the at least one second pass member communicating with the space between the first pipe and the second pipe.

The first pass member may be connected to a passage hole formed in an exhaust member of the second pipe.

The second pass member may be connected to a passage hole formed in an infusion member of the first pipe.

In still yet another aspect, a fuel cell system may include a reformer as described above for generating hydrogen gas from fuel containing hydrogen through a chemical catalytic reaction using heat energy and at least one electricity generator for generating electrical energy through an electrochemical reaction of the hydrogen gas and oxygen, wherein the reformer includes the pipe assembly having the first reaction assembly for generating heat energy through an oxidation reaction of the fuel, and the second reaction assembly surrounding the first reaction assembly for generating hydrogen gas from the fuel through a reforming reaction using the heat energy.

In still yet another aspect, a fuel cell system may include a reformer as described above for generating hydrogen gas from fuel containing hydrogen through a chemical catalytic reaction using heat energy and at least one electricity generator for generating electrical energy through an electrochemical reaction of the hydrogen gas and oxygen.

The fuel cell system may further include a fuel supply assembly for supplying fuel to the reformer. The fuel supply assembly may include a first tank for storing fuel containing hydrogen, a second tank for storing water, and a fuel pump connected to the first tank and the second tank. The first tank and the second pipe may be interconnected by a first supply line, and the first tank and the second tank are connected to the first pipe through a second supply line.

The fuel cell system may further include an oxygen supply assembly for supplying oxygen to the reformer and the at least one electricity generator. The oxygen supply assembly may include an air compressor for supplying air to the fuel cell system. The air compressor and the second pipe may be interconnected by a third supply line, the first pipe and the at least electricity generator may be interconnected by a fourth supply line, and the at least one electricity generator and the air compressor may be interconnected by a fifth supply line.

DETAILED DESCRIPTION

Figure 1:
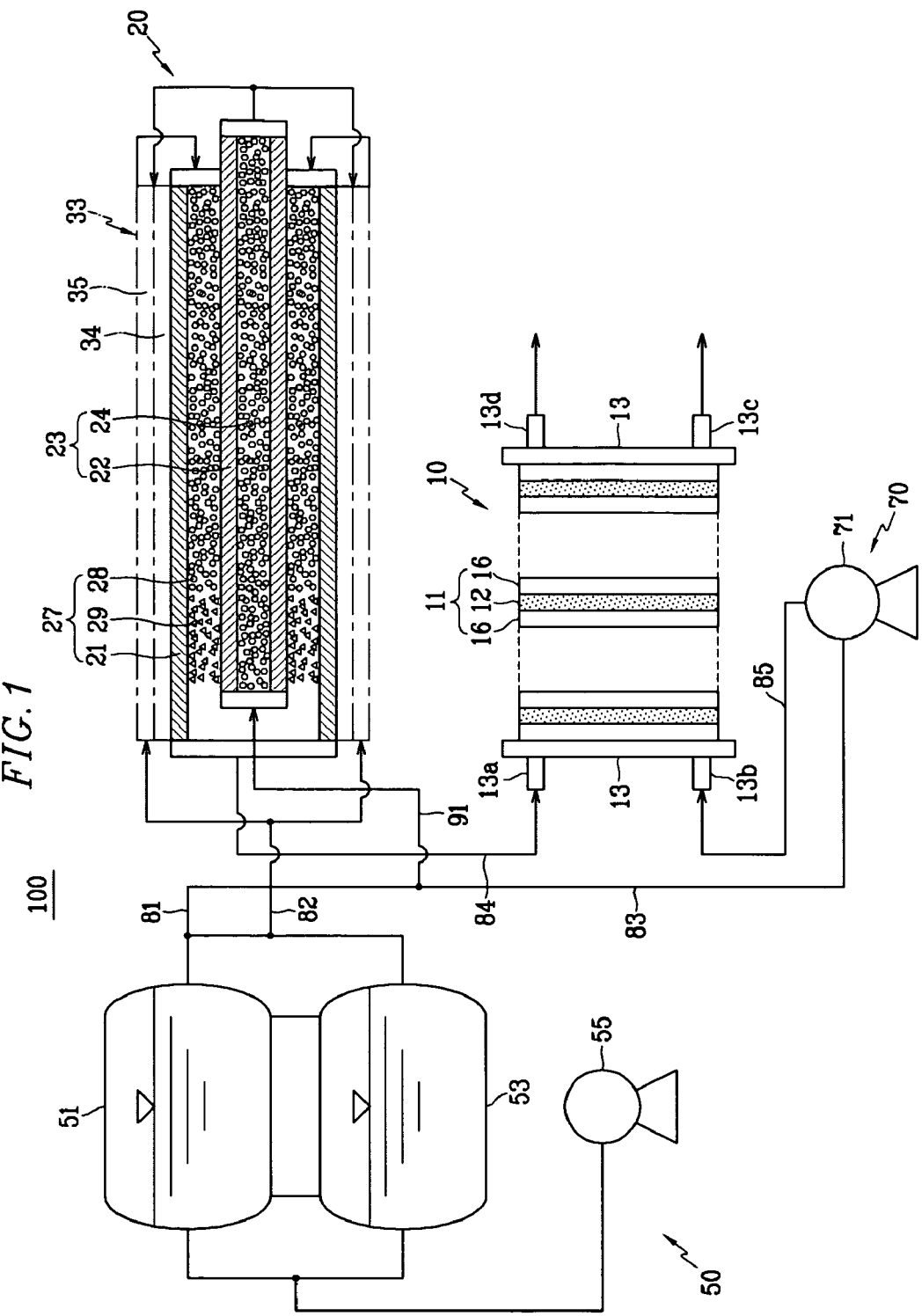
FIG. 1 is a schematic view of a fuel cell system according to an exemplary embodiment of the present invention.
Figure 2:
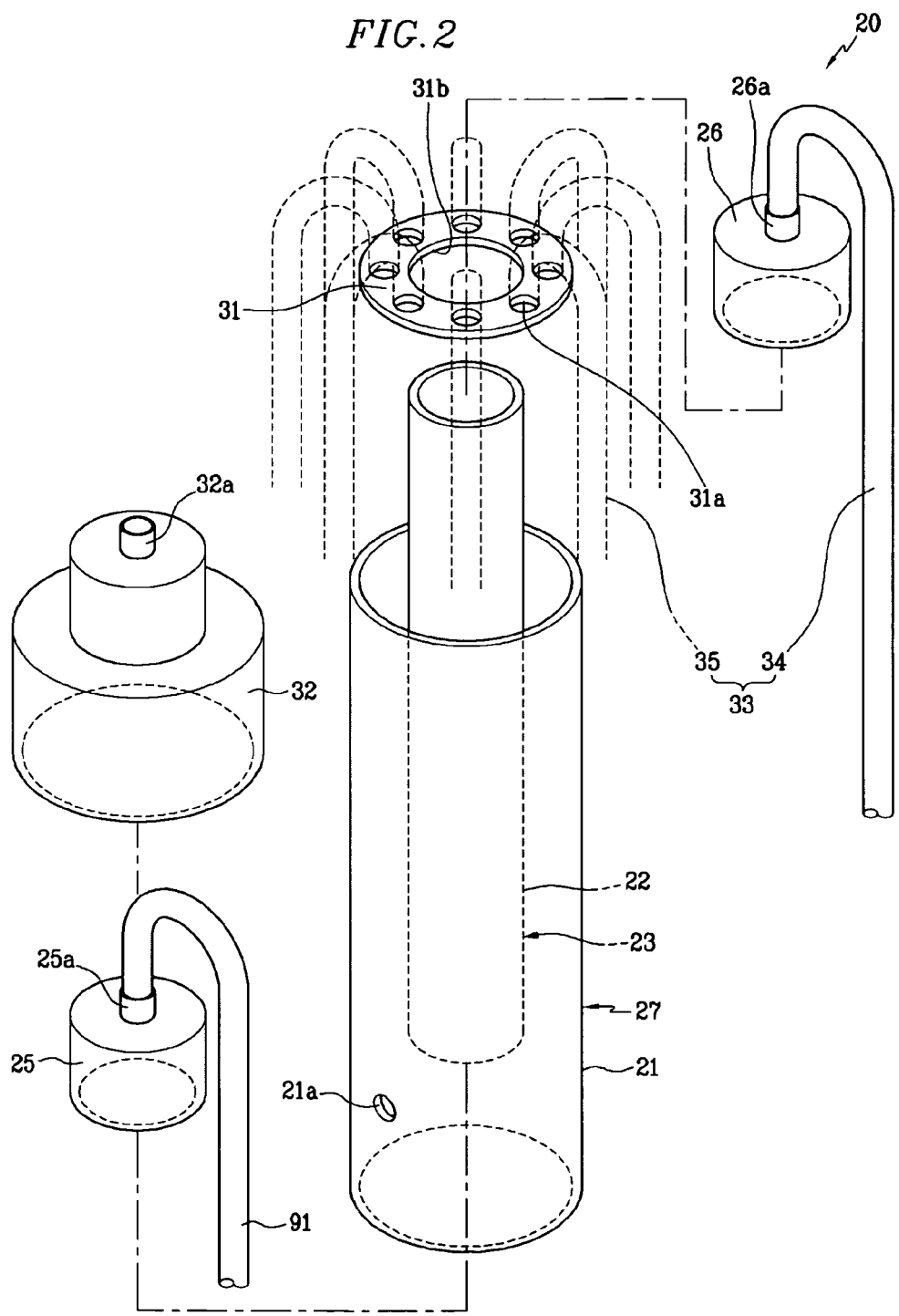
FIG. 2 is an exploded perspective view of a reformer of FIG. 1.
Figure 3:
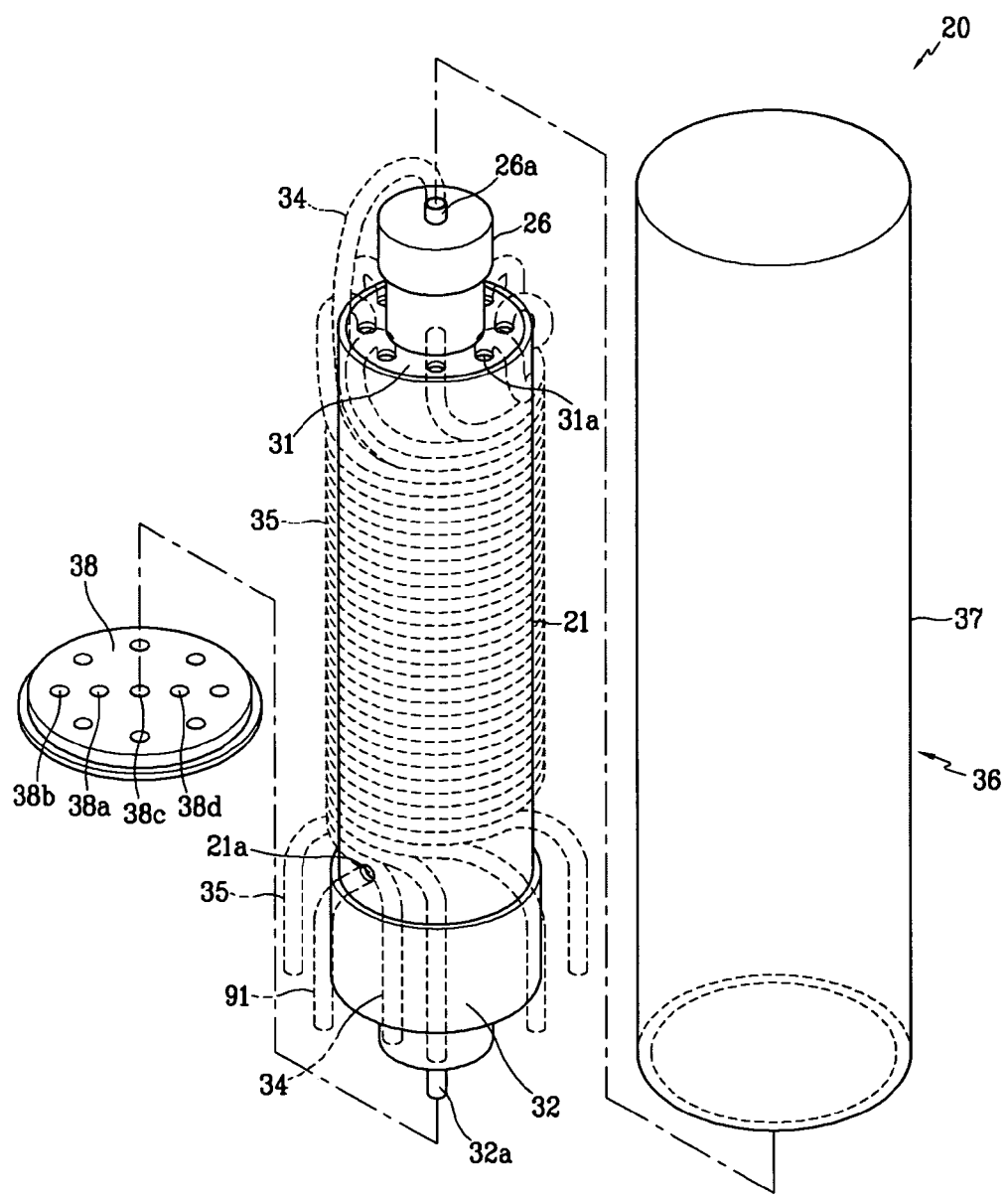
FIG. 3 is a perspective view of a reformer of FIG. 1, in which the reformer is shown in a partially assembled state.
Figure 4:
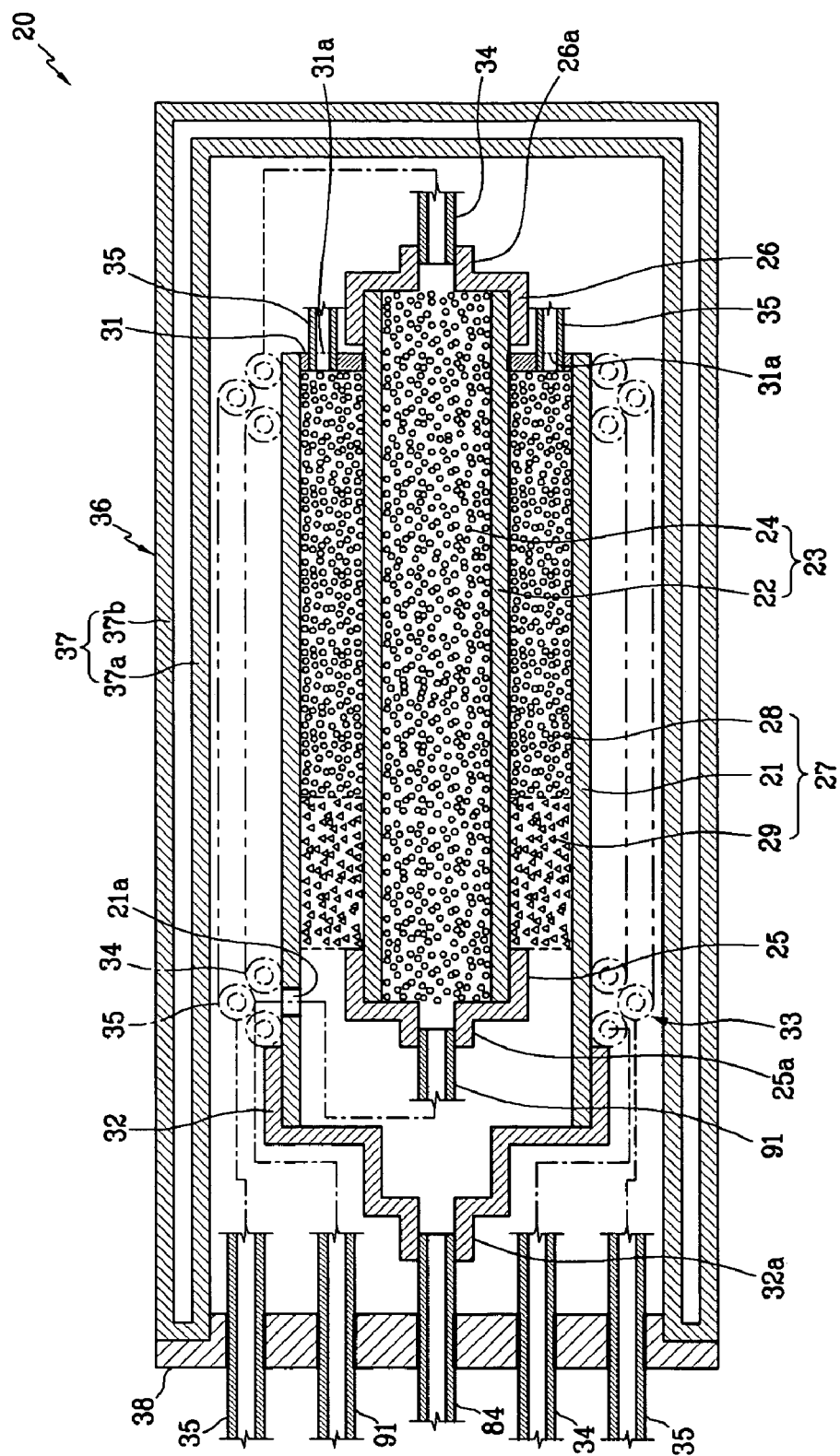
FIG. 4 is a sectional view of a reformer of FIG. 1.

Referring to FIG. 1, the fuel for generating electric energy in the fuel cell system 100 contains hydrogen such as methanol, ethanol, natural gas, etc., typically in liquid form, possibly also mixed with water. In addition, in the fuel cell system 100 according to an exemplary embodiment of the present invention, oxygen to react with hydrogen contained in fuel may be pure oxygen gas stored in a separate storage container, or simply the oxygen contained in air may be used. In the following description, the oxygen contained in air is used.

The fuel cell system 100 includes a reformer 20 for generating hydrogen gas from liquid fuel, a stack 10 for converting chemical reaction energy of the hydrogen gas and oxygen into electrical energy to thereby generate electricity, a fuel supply assembly 50 for supplying the fuel to the reformer 20, and an oxygen supply assembly 70 for supplying oxygen (i.e., air containing oxygen) to the stack 10.

In the fuel system 100 with the above basic structure, a PEMFC method is used in which hydrogen gas is generated through the reformer 20, and the hydrogen gas is supplied to the stack 10 to thereby generate electrical energy by an electrochemical reaction between oxygen and hydrogen.

The fuel supply assembly 50 includes a first tank 51 for storing liquid fuel, a second tank 53 for storing water, and a fuel pump 55 connected to the first tank 51 and the second tank 53. The oxygen supply assembly 70 includes an air compressor 71 for supplying air to the fuel system 100 using a predetermined pumping force.

The reformer 20 receives fuel from the fuel supply assembly 50, generates hydrogen gas from the fuel, and supplies the hydrogen gas to the stack 10. The reformer 20 will be described in greater detail below.

With reference now to FIGS. 1-4, the reformer 20 is realized using a configuration of at least two substantially coaxial pipes such that separated spaces are provided in the reformer 20. The reformer 20 includes a first reaction assembly 23 and a second reaction assembly 27. The first reaction assembly 23 generates heat energy by an oxidation reaction between liquid fuel and air. The second reaction assembly 27 generates hydrogen gas from mixed fuel through a reforming reaction using the heat energy, and reduces the concentration of carbon monoxide in the hydrogen gas.

In the exemplary embodiment, the reformer 20 includes a first pipe 21, and a second pipe 22 positioned within the first pipe 21. The first pipe 21 has a predetermined cross-sectional area (or predetermined circumference), and is formed substantially as a cylindrical pipe with open ends. The second pipe 22 has a predetermined cross-sectional area (or predetermined circumference) that is smaller than that of the first pipe 22, and is similarly formed substantially as a cylindrical pipe with open ends. The first and second pipes 21, 22 are substantially coaxially arranged as described above, thereby resulting in substantially uniform spacing between the first and second pipes 21, 22. The first and second pipes 21, 22 may be made of a conductive material such as stainless steel, aluminum, copper, and iron.

With the basic structure of the reformer 20 described above, the first reaction assembly 23 includes an oxidation catalyst layer 24 formed within the second pipe 22. An injection hole 25a is formed on one end of the first reaction assembly 23, and an exhaust hole 26a is formed on its other end.

The injection hole 25a enables the supply of liquid fuel and air into the second pipe 22, while the exhaust hole 26a allows for the exhaust of combusted gas, which is created by an oxidation reaction between the liquid fuel and air, from inside the second pipe 22.

In more detail, the first reaction assembly 23 is formed by connecting a first cap 25 having the injection hole 25a on one end of the second pipe 22, and connecting a second cap 26 having the exhaust hole 26a on the other end of the second pipe 22. Supply lines 81, 91 are connected between the injection hole 25a of the first cap 25 and the first tank 51, and a third supply line 83 is connected between the injection hole 25a and the air compressor 71. In an exemplary embodiment, the first supply line 81 and the third supply line 83 are joined by the single linking line 91, and are connected to the injection hole 25a of the first cap 25 through the linking line 91. In this case, the linking line 91 may pass through an insulator 36, which will be described below, and the first pipe 21 for connection to the injection hole 25a. A first passage hole 21a is formed in the first pipe 21 to allow for the passage of the linking line 91 therethrough.

The oxidation catalyst layer 24 is filled in the second pipe 22 and acts to accelerate the oxidation reaction between the liquid fuel and air to thereby generate a heat source of a predetermined temperature. The oxidation catalyst layer 24 comprises catalyst material such as platinum (Pt), ruthenium (Ru), etc. provided on a carrier such as alumina ($Al_2O_3$), silica ($SiO_2$), or titania ($TiO_2$), etc. in pellet form.

The second reaction assembly 27 according to the exemplary embodiment of the present invention includes a reforming catalyst layer 28 formed in the space between the first pipe 21 and the second pipe 22. Injection holes 31a are formed on one end of the first pipe 21, and an exhaust hole 32a is formed on its other end.

The injection holes 31a are formed as openings through which mixed fuel (i.e., liquid fuel and water) is supplied to between the first pipe 21 and the second pipe 22. The exhaust hole 32a is an opening through which hydrogen gas generated by a reforming reaction of the mixed fuel is discharged out from the reformer 20.

In more detail, the second reaction assembly 27 is formed by connecting a third cap 31 having the injection holes 31a on one end of the first pipe 21, and connecting a fourth cap 32 having the exhaust hole 32a and connected on the other end of the first pipe 21. The third cap 31 includes a connecting hole 31b through which the second pipe 22 passes, and the injection holes 31a are formed in the third cap 31 radially from the connecting hole 31b to thereby surround the connecting hole 31b. A second supply line 82 is connected between the injection holes 31a and the first and second tanks 51 and 53, and a fourth supply line 84 is connected between the exhaust hole 32a and an electricity generator 11 of the stack 10. The electricity generator 11 will be described in more detail below. The fourth supply line 84 passes through the insulator 36, which will be described below, to thereby interconnect the electricity generator 11 and the exhaust hole 32a.

The reforming catalyst layer 28 is filled in the space between the first pipe 21 and the second pipe 22, and acts to accelerate a reforming reaction of the mixed fuel, that is, accelerate a decomposition reaction of the mixed fuel and a degeneration reaction of carbon monoxide to thereby generate hydrogen gas from the mixed fuel. The reforming catalyst layer 28 comprises catalyst material such as copper (Cu), nickel (Ni), or platinum (Pt), etc. provided on a carrier such as alumina ($Al_2O_3$), silica ($SiO_2$), or titania ($TiO_2$), etc. in pellet form.

Further, the second reaction assembly 27 may include a water-gas shift catalyst layer 29 in the space between the first and second pipes 21 and 22, and immediately adjacent to the reforming catalyst layer 28. The water-gas shift catalyst layer 29 acts to reduce the concentration of carbon monoxide contained in the hydrogen gas through a water-gas shift (WGS) reaction. The water-gas shift catalyst layer 29 may be positioned in the vicinity of the exhaust hole 32a of the fourth cap 32 at the furthest end of a path through which the mixed fuel travels after injection via the injection holes 31a of the third cap 31. As a result of first passing through the reforming catalyst layer 28, the mixed fuel reaches the water-gas shift catalyst layer 29 in a state converted into hydrogen gas. The water-gas shift catalyst layer 29 is formed by catalyst material such as copper (Cu), zinc (Zn), iron (Fe), or chrome (Cr), etc. in carriers including alumina ($Al_2O_3$), silica ($SiO_2$), or titania ($TiO_2$), etc. in pellet form.

In order to optimize efficiency in the use of heat energy generated by the first reaction assembly 23, the reformer 20 according to the exemplary embodiment includes a heat transfer unit 33, which supplies the heat energy to the second reaction assembly 27.

The heat transfer unit 33 includes a first pass member 34 for transmitting combusted gas, which is at a relatively high temperature and discharged through the exhaust hole 26a of the second pipe 22, along a direction of an outer circumference of the first pipe 21. The heat transfer unit 33 also includes second pass members 35 for transmitting the heat energy moving through the first pass member 34 to the mixed fuel that is supplied to the injection holes 31a of the first pipe 21.

One end of the first pass member 34 is connected to the exhaust hole 26a of the second pipe 22, that is, to the exhaust hole 26a of the second cap 26. The first pass member 34 is tube-shaped and wrapped around an outer circumference of the first pipe 21 in a coil configuration. Opposite ends of the first pass member 34 passes through the insulator 36, which will be described below, and extends to the outside of the same.

One end of each second pass member 35 is connected to respective injection holes 31a of the first pipe 21, that is, to each of the injection holes 31a formed radially in the third cap 31. In a state contacting the first pass member 34, the second pass members 35 are also tube-shaped and wrap around the outer circumference of the first pipe 21 in a coil configuration. An opposite end of the second pass members 35 pass through the insulator 36, which will be described below, and extend to the outside of the same to connect to the first and second tanks 51, 53 via the second supply line 82.

During the operation of the reformer 20 structured as described above, the heat energy generated in the first reaction assembly 23 is not fully transferred to the second reaction assembly 27, and may be discharged to the outside of the reformer 20. The temperature in the second reaction assembly 27 is not uniform as a result, which leads to a reduction in reaction and heat efficiencies.

The insulator 36 is further included in the reformer 20 of the exemplary embodiment of the present invention to overcome this problem. That is, the insulator 36 prevents heat energy generated in the first reaction assembly 23 from being discharged to outside the reformer 20.

The insulator 36 includes a tube 37 in the form of a cylinder with a first end open and a second end closed. The tube 37 surrounds the first pipe 21 and the heat transfer unit 33. The insulator 36 also includes a sealing cap 38 connected to the first end of the tube 37 to substantially seal the same.

The tube 37 includes an inner wall 37a that is adjacent to the first pipe 21, and an outer wall 37b that surrounds the inner wall 37a in a state maintaining a predetermined gap with the inner wall 37a. A vacuum may be formed in the gap between the inner wall 37a and the outer wall 37b. Further, the inner wall 37a and the outer wall 37b are made of a material selected from the group consisting of ceramic, stainless steel, zirconium, aluminum, and a mixture thereof.

The sealing cap 38 may be screw-coupled to the first end of the tube 37, or connected to the same using a configuration in which the sealing cap 38 is partially and tightly inserted into the tube 37. The linking line 91, which supplies liquid fuel and air into the second pipe 22, passes through the sealing cap 38 and the first pipe 22 to be connected to the injection hole 25a of the second pipe 22. Further, the second pass members 35, which supply the mixed fuel to the gap between the first pipe 21 and the second pipe 22, pass through the sealing cap 38 from the space in the tube 37 and are extended externally to the tube 37. Further, the fourth supply line 84, which is connected to the electricity generator 11 of the stack 10, passes through the sealing cap 38 for connection to the exhaust hole 32a of the first pipe 21. In addition, the first pass member 34, which discharges combustion gas of liquid fuel and air generated in the second pipe 22, passes through the sealing cap 38 from the space in the tube 37 and extends to outside the tube 37. To realize this configuration, there is formed in the sealing cap 38 a second passage hole 38a through which the linking line 91 passes for connection to the injection hole 25a, third passage holes 38b through which the second pass members 35 pass for extension to outside the tube 37, a fourth passage hole 38c through which the fourth supply line 84 passes for connection to the exhaust hole 32a, and a fifth passage hole 38d through which the first pass member 34 passes for extension to outside the tube 37.

Figure 5:
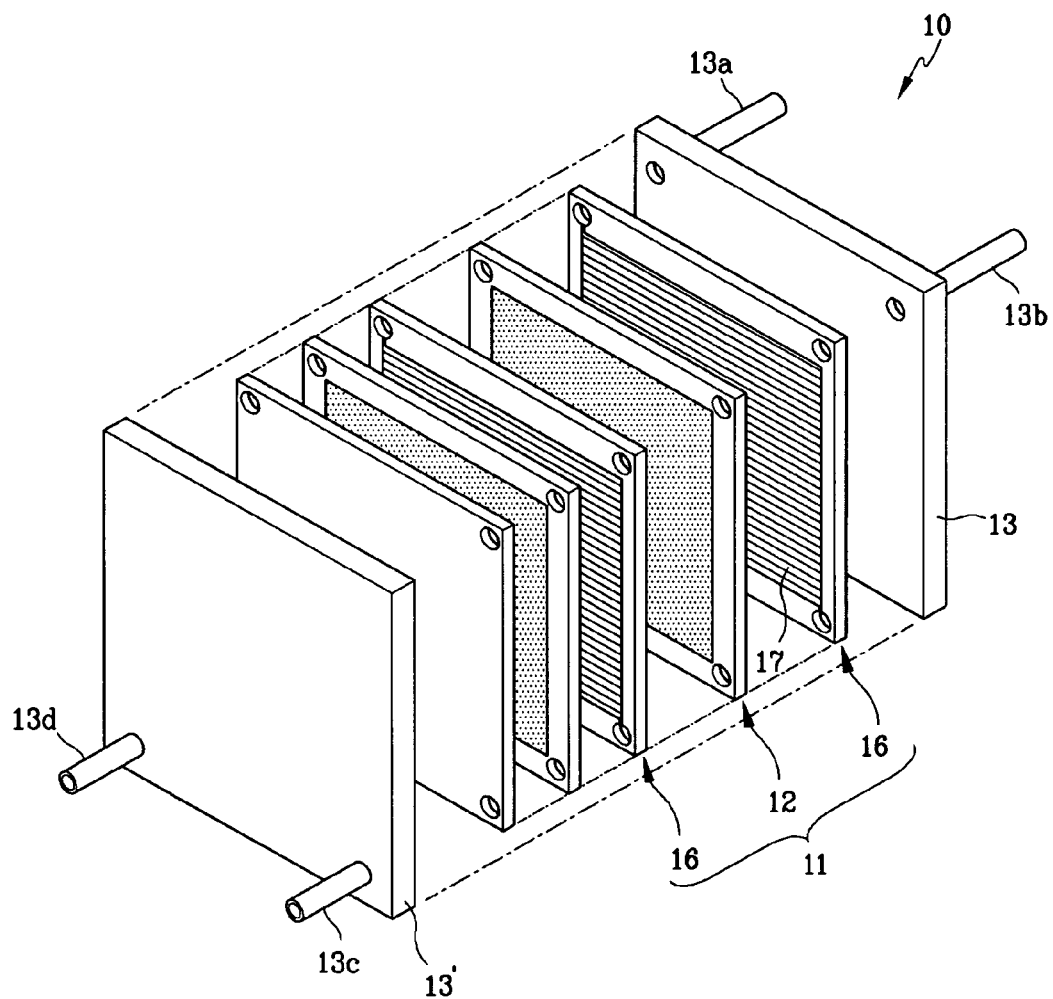
FIG. 5 is an exploded perspective view of a stack of FIG. 1.

With reference now to FIGS. 1 and 5, the stack 10 includes at least one electricity generator 11 for generating electrical energy through an oxidation/reduction reaction of hydrogen gas generated by the reformer 20 using oxygen contained in the air.

Each of the electricity generators 11 (in the case where there is more than one) forms a minimum unit cell for generating electricity by interposing a an MEA 12 between two separators 16. In the exemplary embodiment, a plurality of such unit cells are combined to form the stack 10 in a layered configuration. Pressing plates 13, 13' are mounted to opposite outermost layers of the plurality of the electricity generators 11. However, in the present invention, it is possible to omit the pressing plates 13, 13' from the structure and use the separators 16 positioned in the outermost opposing layers of the electricity generator 11 in place of the pressing plates 13. When the pressing plates 13, 13' are included in the structure, however, they may have a function in addition to that of pressing together the plurality of the electricity generators 11. As will be explained in the following, the pressing plates 13, 13' may act such that the separators 16 are made to have a particular function.

An anode electrode and a cathode electrode are mounted to opposite surfaces of each of the MEAs 12, and an electrolyte layer is positioned between the two electrodes. The anode electrode effects an oxidation reaction of hydrogen gas, and converted electrons are attracted outwardly so that current is generated by the flow of the electrons. Hydrogen ions are moved to the cathode electrode by this current through the electrolyte layer. The cathode electrode effects a reduction reaction of the hydrogen ions, electrons, and oxygen to realize conversion into water. Further, the electrolyte layer makes possible ion exchange in which the hydrogen ions generated in the anode electrode are moved to the cathode electrode.

Each of the separators 16 acts as a path through which hydrogen gas and air needed for the oxidation/reduction reaction of the MEAs 12 are supplied to the anode electrode and the cathode electrode. Each of the separators 16 also function as a conductor for connecting in series the corresponding anode electrode and the cathode electrode. In more detail, each of the separators 16 forms a hydrogen path on a surface of the MEA 12 closely contacting the anode electrode for supplying hydrogen gas to the =anode electrode, and provides a flow channel 17 that forms a path on a surface of the MEA 12 closely contacting the cathode electrode for supplying air to the cathode electrode.

Input pressing plate 13 includes a first infusion member 13a for supplying hydrogen gas to the hydrogen path of the separator 16 and a second infusion member 13b for supplying air to the air path of the separator 16. Output pressing plate 13' includes a first discharge member 13c for exhausting hydrogen gas remaining after reaction in the anode electrode of the MEA 12 and a second discharge member 13d for exhausting air remaining after reaction of water and hydrogen generated by a combination reaction of hydrogen and oxygen in the cathode electrode of the MEA 12. The first infusion member 13a and the exhaust hole 32a of the first pipe 21 of the reformer 20 are connected through the fourth supply line 84, and the second infusion member 13b and the air compressor 71 are connected through the fifth supply line 85. In another configuration, the first discharge member 13c and the injection hole 25a of the second pipe 22 of the reformer 20 are connected by a separate line (not shown).

Assembly of the reformer 20 and the overall operation of the fuel cell system 100 will now be described.

To assemble the reformer 20, the first cap 25 is connected to one end of the second pipe 22, then the second pipe 22 is positioned within the first pipe 21. Preferably, positioning is performed such that long axes of the second pipe 22 and the first pipe 21 substantially overlap one another.

Next, the linking line 91 is connected to the first tank 51, and the air compressor 71 is passed through the second passage hole 38a then connected to the injection hole 25a of the first cap 25 after being passed through the first passage hole 21a formed in the first pipe 21.

Subsequently, the fourth cap 32 is connected to one end of the first pipe 21, and the fourth supply line 84, which is connected to the first infusion member 13a, is connected to the exhaust hole 32a of the fourth cap 32 in a state where the fourth supply line 84 is passed through the fourth passage hole 38c of the sealing cap 38.

The water-gas shift catalyst layer 29 and the reforming catalyst layer 28 are then filled in this order in the gap between the first pipe 21 and the second pipe 22, and the third cap 31 is connected to the other end of the first pipe 21 in a state where the other end of the second pipe 22 is positioned in the connecting hole 31b of the third cap 31.

Following the above, the second cap 26 is connected to this other end of the second pipe 22 passed through the connecting hole 31b of the third cap 31 and in a state where the oxidation catalyst layer 24 is filled in the space in the second pipe 22.

Next, one end of the first pass member 34 is connected to the exhaust hole 26a of the second cap 26, then the first pass member 34 is wound around the outer circumference of the first pipe 21 in a coil configuration, after which the other end of the first pass member 34 is passed through the fifth passage hole 38d of the sealing cap 38.

One end of each of the second pass members 35 are then connected to the respective injection holes 31a of the third cap 31. Then the second pass members 35 are wound around the outer circumference of the first pipe 21 to thereby contact the first pass member 34 already positioned in this manner on the first pipe 21. The other end of the second pass members 35 are passed through the third passage holes 38b of the sealing cap 38.

The first pipe 21 (and all elements connected thereto as described above) is positioned within the tube 37 of the insulator 36. The sealing cap 38 is then connected to one end of the tube 37 to thereby seal the inside of the tube 37.

With assembly of the reformer 20 completed, the fuel pump 55 is operated such that the liquid fuel stored in the first tank 51 is supplied to inside the second pipe 22 through the first supply line 81. At the same time, the air compressor 71 is operated such that air is supplied to inside the second pipe 22 via the third supply line 83. As a result, the liquid fuel passing through the first supply line 81 and the air passing through the third supply line 83 are injected through the linking line 91 into the second pipe 22 in a mixed state.

Accordingly, the liquid fuel and the air pass through the oxidation catalyst layer 24 in the second pipe 22 to thereby undergo a catalytic oxidation reaction. The liquid fuel and the air are combusted through the catalytic oxidation reaction to thereby generate reaction heat of a predetermined temperature. The reaction heat is transmitted to the gap between the first pipe 21 and the second pipe 22 through the second pipe 22.

Next, the combustion gas of a relatively high temperature and generated in the second pipe 22 is exhausted through the first pass member 34. The first pass member 34 is heated to a predetermined temperature by the heat of the combustion gas passing therethrough.

In this state, the fuel pump 55 is operated such that the liquid fuel stored in the first tank 51 and the water stored in the second tank 53 are supplied to the second pass members 35 via the second supply line 82. The mixed fuel of liquid fuel and water passing through the second pass members 35 receives the heat generated in the first pass member 34 as a result of the second pass members 35 being in contact with the first pass member 34, which is heated to a predetermined temperature as described above. The mixed fuel is therefore pre-heated by this process.

The pre-heated mixed fuel is injected in the gap between the first pipe 21 and the second pipe 22, and passes through the reforming catalyst layer 28 formed in the gap to thereby absorb the heat energy supplied from the second pipe 22. During this process, a mixed fuel reaction occurs in the gap between the first pipe 21 and the second pipe 22 as a result of the reforming catalyst layer 28 to thereby generate hydrogen gas that contains carbon dioxide and hydrogen. At this time, hydrogen gas containing carbon monoxide is generated as a by-product in the gap between the first and second pipes 21 and 22.

Subsequently, the hydrogen gas passes through the water-gas shift catalyst layer 29. Therefore, additional hydrogen gas is generated through a water-gas shift catalytic reaction in the vicinity of the exhaust hole 32a of the first pipe 21, and the concentration of the carbon monoxide in this hydrogen gas is reduced.

During the above processes, reaction heat generated in the space of the second pipe 22 is blocked by the insulator 36 and prevented from being discharged to outside the second pipe 22. That is, during the transmission of the heat energy generated in the first reaction assembly 23 to the second reaction assembly 27 and to the heat transfer unit 33, the heat energy undergoes initial insulation by the inner wall 37a of the tube 37, then undergoes secondary insulation by the vacuum space between the inner and outer walls 37a and 37b of the tube 37 and by the outer wall 37b itself. Accordingly, the reaction and heat efficiencies of the reformer 20 are enhanced by such prevention in the loss of heat energy generated in the first reaction assembly 23.

Next, the hydrogen gas with a reduced concentration of carbon monoxide is supplied to the first infusion member 13a of the stack 10 via the fourth supply line 84. At the same time, the air compressor 71 is operated such that air is supplied to the second infusion member 13b of the stack 10 through the fifth supply line 85.

As a result, the hydrogen gas is supplied to the anode electrode of the MEA 12 through the hydrogen path of the separator 16. Further, the air is supplied to the cathode electrode of the MEA 12 through the air path of the separator 16.

Accordingly, the hydrogen gas is resolved into electrons and protons (hydrogen ions) through the oxidation reaction in the anode electrode. Also, the protons flow to the cathode electrode through the electrolyte layer, while the electrons, unable to flow through the electrolyte layer, flow instead to the cathode electrode of the adjacent MEA 12 through the separator 16. The flow of the electrons forms a current, which generates additional heat and water.

Figure 6:
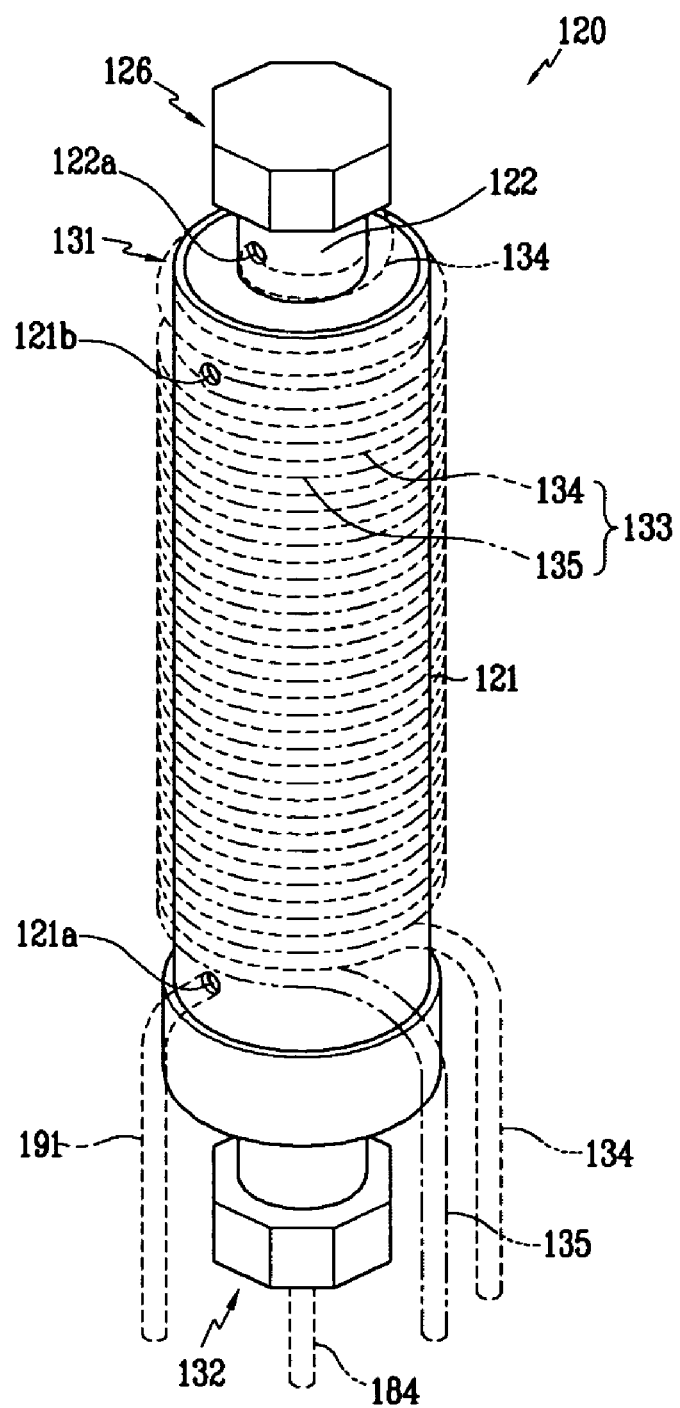
FIG. 6 is a perspective view of a reformer according to another exemplary embodiment of the present invention.
Figure 7:
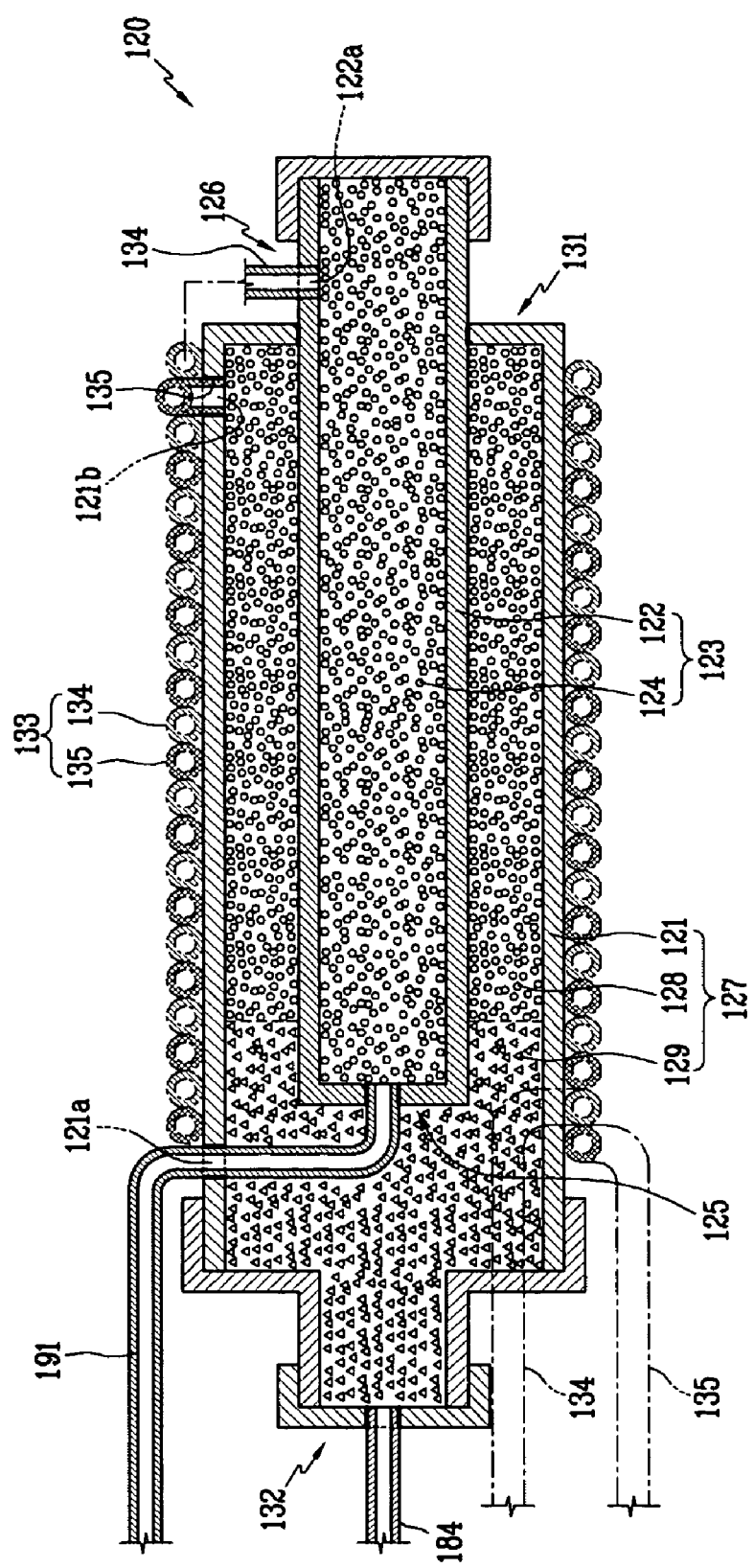
FIG. 7 is a sectional view of the reformer of FIG. 6.

FIG. 6 is a perspective view of a reformer according to another exemplary embodiment of the present invention, and FIG. 7 is a sectional view of the reformer of FIG. 6.

As in the exemplary embodiment described above, a reformer 120 according to this embodiment includes a first pipe 121, and a second pipe 122 positioned within the first pipe 121 to thereby form two independent spaces. Further, the reformer 120 includes a first reaction assembly 123 that generates heat energy by an oxidation reaction between liquid fuel and air, and a second reaction assembly 127 that generates hydrogen gas from mixed fuel through a catalytic reforming reaction using the heat energy, and reduces the concentration of carbon monoxide in the hydrogen gas.

The first reaction assembly 123 has an oxidation catalyst layer 124 formed within the second pipe 122. An injection hole 125 is formed on one end of the second pipe 122, and an exhaust hole 126 is formed on its other end.

The injection hole 125 enables the supply of liquid fuel and air into the second pipe 122, while the exhaust hole 126 allows for the exhaust of combusted gas, which is created by an oxidation reaction between the liquid fuel and air, from inside the second pipe 122.

Further, a supply line 191 is connected to the injection hole 125 of the second pipe 122 to enable the supply of fuel and air thereto. The supply line 191 passes through the first pipe 121 for connection to the injection hole 125 of the second pipe 122. A first passage hole 121a is formed in the first pipe 121 to allow the supply line 191 to pass through the first pipe 121.

The second reaction assembly 127 includes a reforming catalyst layer 128 formed in the space between the first pipe 121 and the second pipe 122. An infusion member 131 is formed on one end of the first pipe 121, and an exhaust member 132 is formed on its other end.

The infusion member 131 is formed as an opening through which mixed fuel (i.e., liquid fuel and water) is supplied between the first pipe 121 and the second pipe 122. The exhaust member 132 is an opening through which hydrogen gas generated by a catalytic reforming reaction of the mixed fuel is discharged out from the reformer 120. Further, an exhaust line 184 that allows for the exhaust of the hydrogen gas is connected to the exhaust member 132 of the first pipe 121.

The second reaction assembly 127 further includes a water-gas shift catalyst layer 129 in the space between the first and second pipes 121 and 122, and immediately adjacent to the reforming catalyst layer 128. The water-gas shift catalyst layer 129 acts to reduce the concentration of carbon monoxide contained in the hydrogen gas (generated by the reforming catalyst layer 128) through a WGS reaction.

In this exemplary embodiment, the reformer 120 includes a heat transfer unit 133, which supplies the heat energy generated by the first reaction assembly 123 to the second reaction assembly 127 and to the mixed fuel supplied to the second reaction assembly 127.

The heat transfer unit 133 includes a first pass member 134 communicating with the inside of the second pipe 122 and mounted contacting an outer circumference of the first pipe 121, and a second pass member 135 communicating with the gap between the first pipe 121 and the second pipe 122, and mounted contacting the outer circumference of the first pipe 121.

The first pass member 134 acts to transmit along an outer circumferential direction of the first pipe 121 combusted gas of a relatively high temperature that is exhausted through the exhaust hole 126 of the second pipe 122.

The second pass member 135 transmits the heat energy of the combusted gas to the mixed fuel while supplying the mixed fuel to the first and second pipes 121 and 122 via the infusion member 131 of the first pipe 121.

In more detail, the first pass member 134 and the second pass member 135 are formed in a coil configuration on the outer circumference of the first pipe 121 by being wrapped around the same. The first pass member 134 is connected to a second passage hole 122a formed in the exhaust member 126 of the second pipe 122, and the second pass member 135 is connected to a third passage hole 121b formed in the infusion member 131 of the second pipe 121. After connection to the second passage hole 122a and the third passage hole 121b, the first pass member 134 and the second pass member 135 are respectively wound around the first pipe 121 in an alternating manner and in the coil configuration described above.

Since the operation of the reformer 120 is substantially identical to that of the preceding embodiment, a detailed description thereof will not be provided.

In the fuel cell system of the present invention described above, a dual-pipe configuration is used for the reformer so that it is able to rapidly transmit the heat energy required for the various fuel reactions that occur in the system. As a result, overall performance and heat efficiency of the system are improved. Such a dual-pipe configuration also allows the reformer to be made to a compact size.

Further, a structure is used in which fuel supplied to the reformer may be pre-heated during initial operation of the fuel cell system. This further increases heat efficiency and also enhances operation performance.

Finally, there is provided a configuration that insulates the heat energy required for a reforming reaction such that reaction and heat efficiencies are additionally enhanced.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A reformer for a fuel cell system comprising:
   a pipe assembly forming independent spaces through which fuel containing hydrogen passes,
   wherein the pipe assembly comprises:
     a first reaction assembly adapted to generate heat energy and a combusted gas by an oxidation reaction of the fuel, and having an injection hole for receiving the fuel and an exhaust hole for exhausting the combusted gas, a second reaction assembly having an exterior wall surrounding the first reaction assembly and adapted to generate hydrogen gas from the fuel through a reforming reaction using the heat energy;
a first pass member coupled to the exhaust hole of the first reaction assembly for transferring the combusted gas carrying the heat energy from the first reaction assembly; and
a second pass member for transferring the fuel to the second reaction assembly,
wherein the first pass member and the second pass member are alternately wrapped around the exterior wall of the second reaction assembly in a coil configuration, and are directly adjacent to the exterior wall of the second reaction assembly, and
wherein the first pass member and the second pass member are configured to transfer the heat energy of the combusted gas to the fuel prior to entering the second reaction assembly in a portion of the pipe assembly proximate and surrounding the exterior wall of the second reaction assembly.

2. The reformer of claim 1, wherein the pipe assembly further comprises:
a first pipe; and
a second pipe having an outer circumference less than an inner circumference of the first pipe,
wherein the independent spaces are formed respectively in the second pipe and between the first pipe and the second pipe, and
wherein the first reaction assembly comprises an oxidation catalyst layer formed within an interior space of the second pipe, the oxidation catalyst layer adapted to facilitate an oxidation reaction.

3. The reformer of claim 2, wherein the second reaction assembly comprises a reforming catalyst layer formed in a space between the first pipe and the second pipe, the reforming catalyst layer adapted to facilitate a reforming reaction.

4. The reformer of claim 2, wherein the second reaction assembly comprises a reforming catalyst layer formed in a space between the first pipe and the second pipe that generates hydrogen gas from the fuel by a catalytic reforming reaction, and a water-gas shift catalyst layer that reduces a concentration of carbon monoxide contained in the hydrogen gas.

5. A reformer for a fuel cell system comprising:
a pipe assembly forming independent spaces through which fuel containing hydrogen passes, wherein the pipe assembly comprises:
a first reaction assembly adapted to generate heat energy and a combusted gas by an oxidation reaction of the fuel, and having an injection hole for receiving the fuel and an exhaust hole for exhausting the combusted gas, and
a second reaction assembly having an exterior wall surrounding the first reaction assembly and adapted to generate hydrogen gas from the fuel through a reforming reaction using the heat energy; and
a heat transfer unit adapted to transfer the heat energy to the fuel supplied to the second reaction assembly,
wherein the heat transfer unit comprises:
a first pass member coupled to the exhaust hole of the first reaction assembly for transferring the combusted gas carrying the heat energy from the first reaction assembly; and
at least one second pass member for transferring the fuel to the second reaction assembly, wherein the first pass member and the at least one second pass member are alternately wrapped around the exterior wall of the second reaction assembly in a coil configuration, and are directly adjacent to the exterior wall of the second reaction assembly, and
wherein the first pass member and the at least one second pass member are configured to transfer the heat energy of the combusted gas to the fuel prior to entering the second reaction assembly in a portion of the pipe assembly proximate and surrounding the exterior wall of the second reaction assembly.

6. The reformer of claim 5, wherein the pipe assembly further comprises:
a first pipe; and
a second pipe having an outer circumference less than an inner circumference of the first pipe,
wherein the independent spaces are formed respectively in the second pipe and between the first pipe and the second pipe.

7. The reformer of claim 6, wherein the first reaction assembly comprises an oxidation catalyst layer formed within an interior space of the second pipe and adapted to facilitate an oxidation reaction.

8. The reformer of claim 7, wherein the second reaction assembly comprises a reforming catalyst layer formed in a space between the first pipe and the second pipe, the reforming catalyst layer adapted to facilitate a reforming reaction.

9. The reformer of claim 7, wherein the second reaction assembly comprises a reforming catalyst layer formed in a space between the first pipe and the second pipe that generates the hydrogen gas from the fuel by a catalytic reforming reaction, and a water-gas shift catalyst layer that reduces a concentration of carbon monoxide contained in the hydrogen gas.

10. The reformer of claim 6, wherein:
the first pass member wraps around an outer circumference of the first pipe in the coil configuration, and communicating with the interior space in the second pipe; and
the at least one second pass member wraps around the outer circumference of the first pipe in a state contacting the first pass member, and communicating with a space between the first pipe and the second pipe.

11. A reformer for a fuel cell system comprising:
a pipe assembly formed by a first pipe and a second pipe having an outer circumference less than an inner circumference of the first pipe, independent spaces being formed respectively in the second pipe and between the first pipe and the second pipe, the pipe assembly comprising:
a first reaction assembly having an oxidation catalyst layer adapted to generate a heat energy and a combusted gas by an oxidation reaction of fuel containing hydrogen, the oxidation catalyst layer being formed within an interior space of the second pipe, the first reaction assembly having an injection hole for receiving the fuel and an exhaust hole for exhausting the combusted gas;
a second reaction assembly having a reforming catalyst layer adapted to generate hydrogen gas from the fuel through a reforming reaction using the heat energy, the reforming catalyst layer being formed in a space between the first pipe and the second pipe; and
a heat transfer unit adapted to transfer the heat energy to the fuel supplied to the second reaction assembly, the heat transfer unit comprising:
a first pass member coupled to the exhaust hole of the first reaction assembly for transferring the combusted gas carrying the heat energy from the first reaction assembly; and at least one second pass member for transferring the fuel to the second reaction assembly, wherein the first pass member and the at least one second pass member are alternately wrapped around an exterior wall of the first pipe in a coil configuration, and are directly adjacent to the exterior wall of the first pipe, wherein the first pass member and the at least one second pass member are configured to transfer the heat energy of the combusted gas to the fuel prior to entering the second reaction assembly in a portion of the pipe assembly proximate and surrounding the exterior wall of the first pipe.

12. The reformer of claim 11, wherein:
the first reaction assembly comprises a first cap having an injection hole on one end of the second pipe, and a second cap having an exhaust hole on the other end of the second pipe, and
the second reaction assembly comprises a third cap having at least one injection hole on one end of the first pipe, and a fourth cap having an exhaust hole on the other end of the first pipe.

13. The reformer of claim 12, wherein the third cap comprises a connecting hole through which the second pipe passes, and the at least one injection hole comprises a plurality of injection holes formed in the third cap radially from the connecting hole to thereby surround the connecting hole.

14. The reformer of claim 12, wherein:
the first pass member wraps around an outer circumference of the first pipe in a coil configuration and connected to the exhaust hole of the second cap; and
the at least one second pass member wraps around the outer circumference of the first pipe in a state contacting the first pass member, and connected to the injection hole of the third cap.

15. The reformer of claim 12, wherein the second reaction assembly comprises a water-gas shift catalyst layer formed in a space between the first pipe and the second pipe, the water-gas shift catalyst layer adapted to reduce a concentration of carbon monoxide in the hydrogen gas, the water-gas shift catalyst layer being formed adjacent to the reforming catalyst layer in a vicinity of the exhaust hole of the fourth cap.

16. The reformer of claim 11, wherein each of the first pipe and the second pipe is formed substantially as a cylindrical pipe and made of a conductive material selected from the group consisting of stainless steel, aluminum, copper, and iron.

17. The reformer of claim 11, further comprising an insulator that fully encompasses the first reaction assembly and the second reaction assembly.

18. The reformer of claim 17, wherein the insulator comprises:
an inner wall; and
an outer wall that surrounds the inner wall while maintaining a predetermined gap with the inner wall, and
wherein a vacuum is formed in a gap between the inner wall and the outer wall.

19. The reformer of claim 18, wherein the inner wall and the outer wall are made of a material selected from the group consisting of ceramic, stainless steel, zirconium, aluminum, and a mixture thereof.

20. The reformer of claim 17, wherein the insulator comprises:
a cylindrical tube with a first end open and a second end closed; and
a sealing cap connected to the first end of the tube.

21. A reformer for a fuel cell system comprising:
a pipe assembly formed by a first pipe and a second pipe having an outer circumference less than an inner circumference of the first pipe, independent spaces being formed respectively in the second pipe and between the first pipe and the second pipe, the pipe assembly comprising:
a first reaction assembly having an oxidation catalyst layer adapted to generate a heat energy and a combusted gas by an oxidation reaction of fuel containing hydrogen, the oxidation catalyst layer being formed within an interior space of the second pipe, the first reaction assembly having an injection hole for receiving the fuel and an exhaust hole for exhausting the combusted gas;
a second reaction assembly comprising a reforming catalyst layer adapted to generate hydrogen gas from the fuel through a reforming reaction using the heat energy, the reforming catalyst layer being formed in a space between the first pipe and the second pipe; and
a heat transfer unit adapted to transfer the heat energy to the fuel supplied to the second reaction assembly,
wherein the heat transfer unit comprises:
a first pass member wrapped around an outer circumference of the first pipe in a coil configuration and communicating with the space in the second pipe, and
at least one second pass member wrapped around the outer circumference of the first pipe in a coil configuration in an alternating manner with the first pass member while contacting the first pass member, the at least one second pass member communicating with the space between the first pipe and the second pipe,
wherein the first pass member is coupled to the exhaust hole of the first reaction assembly and transfers the combusted gas carrying the heat energy from the first reaction assembly and the at least one second pass member transfers the fuel to the second reaction assembly, wherein the first pass member and the at least one second pass member are alternately wrapped around an exterior wall of the first pipe, and are directly adjacent to the exterior wall of the first pipe, and
wherein the first pass member and the at least one second pass member are configured to transfer the heat energy of the combusted gas to the fuel prior to entering the second reaction assembly in a portion of the pipe assembly proximate and surrounding the exterior wall of the first pipe.

22. The reformer of claim 21, wherein the first pass member is connected to a passage hole formed in an exhaust member of the second pipe.

23. The reformer of claim 21, wherein the at least one second pass member is connected to a passage hole formed in an infusion member of the first pipe.

24. A fuel cell system comprising:
a reformer adapted to generate hydrogen gas from fuel containing hydrogen through a chemical catalytic reaction using heat energy; and
at least one electricity generator adapted to generate electrical energy through an electrochemical reaction of hydrogen gas and oxygen,
wherein the reformer comprises a pipe assembly having a first reaction assembly adapted to generate the heat energy and a combusted gas through an oxidation reaction of the fuel, the first reaction assembly having an injection hole for receiving the fuel and an exhaust hole for exhausting the combusted gas, and a second reaction assembly having an exterior wall surrounding the first reaction assembly and adapted to generate the hydrogen gas from the fuel through a reforming reaction using the heat energy, wherein the reformer further comprises:
- a first pass member coupled to the exhaust hole of the first reaction assembly for transferring the combusted gas carrying the heat energy from the first reaction assembly; and
- a second pass member for transferring the fuel to the second reaction assembly, wherein the first pass member and the second pass member are alternately wrapped around the exterior wall of the second reaction assembly in a coil configuration, and are directly adjacent to the exterior wall of the second reaction assembly, and wherein the first pass member and the second pass member are configured to transfer the heat energy of the combusted gas to the fuel prior to entering the second reaction assembly in a portion of the pipe assembly proximate and surrounding the exterior wall of the second reaction assembly.

25. The fuel cell system of claim 24, wherein the reformer comprises:
- a first pipe; and
- a second pipe having an outer circumference less than an inner circumference of the first pipe, independent spaces being formed respectively in the second pipe and between the first pipe and the second pipe.

26. The fuel cell system of claim 25, wherein the first reaction assembly comprises an oxidation catalyst layer formed within an interior space of the second pipe, the oxidation catalyst layer adapted to facilitate the oxidation reaction.

27. The fuel cell system of claim 26, wherein the second reaction assembly comprises a reforming catalyst layer formed in a space between the first pipe and the second pipe, the reforming catalyst layer adapted to facilitate the reforming reaction.

28. The fuel cell system of claim 25, wherein the second reaction assembly comprises a reforming catalyst layer formed in a space between the first pipe and the second pipe adapted to facilitate the reforming reaction, and a water-gas shift catalyst layer that reduces a concentration of carbon monoxide contained in the hydrogen gas.

29. A fuel cell system comprising:
- a reformer adapted to generate hydrogen gas from fuel containing hydrogen through a chemical catalytic reaction using heat energy; and
- at least one electricity generator adapted to generate electrical energy through an electrochemical reaction of the hydrogen gas and oxygen, wherein the reformer comprises a pipe assembly having a first reaction assembly adapted to generate the heat energy and a combusted gas through an oxidation reaction of the fuel, the first reaction assembly having an injection hole for receiving the fuel and an exhaust hole for exhausting the combusted gas, a second reaction assembly having an exterior wall surrounding the first reaction assembly and being adapted to generate the hydrogen gas from the fuel through a reforming reaction using the heat energy, and a heat transfer unit adapted to transfer the heat energy to the fuel supplied to the second reaction assembly, wherein the heat transfer unit comprises:
- a first pass member coupled to the exhaust hole of the first reaction assembly for transferring the combusted gas carrying the heat energy from the first reaction assembly; and
- at least one second pass member for transferring the fuel to the second reaction assembly, wherein the first pass member and the at least one second pass member are alternately wrapped around the exterior wall of the second reaction assembly in a coil configuration, and are directly adjacent to the exterior wall of the second reaction assembly, and wherein the first pass member and the at least one second pass member are configured to transfer the heat energy of the combusted gas to the fuel prior to entering the second reaction assembly in a portion of the pipe assembly proximate and surrounding the exterior wall of the second reaction assembly.

30. The fuel cell system of claim 29, wherein the reformer further comprises:
- a first pipe; and
- a second pipe having an outer circumference less than an inner circumference of the first pipe, independent spaces being formed respectively in the second pipe and between the first pipe and the second pipe, wherein the first reaction assembly comprises an oxidation catalyst layer formed within an interior space of the second pipe, the oxidation catalyst layer adapted to facilitate the oxidation reaction.

31. The fuel cell system of claim 30, wherein the second reaction assembly comprises a reforming catalyst layer formed in a space between the first pipe and the second pipe, the reforming catalyst layer adapted to facilitate the reforming reaction.

32. The fuel cell system of claim 30, wherein the second reaction assembly comprises a reforming catalyst layer formed in a space between the first pipe and the second pipe adapted to facilitate the reforming reaction, and a water-gas shift catalyst layer that reduces a concentration of carbon monoxide contained in the hydrogen gas.

33. The fuel cell system of claim 30, wherein the first pass member wraps around an outer circumference of the first pipe in a coil configuration and communicating with the interior space of the second pipe, and the at least one second pass member wraps around the outer circumference of the first pipe in a coil configuration in a state contacting the first pass member, the at least one second pass member in communication with a space between the first pipe and the second pipe.

34. The fuel cell system of claim 30, wherein:
the first reaction assembly comprises a first cap having an injection hole on one end of the second pipe and a second cap having an exhaust hole on the other end of the second pipe, and
the second reaction assembly comprises a third cap having an injection hole on one end of the first pipe and a fourth cap having an exhaust hole on the other end of the first pipe.

35. The fuel cell system of claim 34, wherein
the first pass member wraps around an outer circumference of the first pipe in a coil configuration and connected to the exhaust hole of the second cap, and
the at least one second pass member wraps around the outer circumference of the first pipe in a state contacting the first pass member and connected to the injection hole of the third cap.

36. The fuel cell system of claim 29, further comprising an insulator that fully encompasses the first reaction assembly and the second reaction assembly.

37. The fuel cell system of claim 36, wherein the insulator comprises an inner wall and an outer wall that surrounds the inner wall while maintaining a gap with the inner wall, a vacuum being formable in the gap between the inner wall and the outer wall.

38. The fuel cell system of claim 37, wherein the insulator comprises a cylindrical tube with a first end open and a second end closed, and a sealing cap connected to the first end of the tube.

39. The fuel cell system of claim 30, further comprising a fuel supply assembly adapted to supply the fuel to the reformer, the fuel supply assembly comprising:
   a first tank adapted to store the fuel containing hydrogen;
   a second tank adapted to store water; and
   a fuel pump connected to the first tank and the second tank.

40. The fuel cell system of claim 39, wherein the first tank and the second pipe are interconnected by a first supply line.

41. The fuel cell system of claim 40, wherein the first tank and the second tank are connected to the first pipe through a second supply line.

42. The fuel cell system of claim 30, further comprising an oxygen supply assembly adapted to supply the oxygen to the reformer and the at least one electricity generator, wherein the oxygen supply assembly comprises an air compressor.

43. The fuel cell system of claim 42, wherein the air compressor and the second pipe are interconnected by a third supply line.

44. The fuel cell system of claim 43, wherein the first pipe and the at least one electricity generator are interconnected by a fourth supply line.

45. The fuel cell system of claim 44, wherein the at least one electricity generator and the air compressor are interconnected by a fifth supply line.

* * * * *